2 Sheets—Sheet 1.

D. S. KIDDER.
Fly-Trap.

No. 204,053. Patented May 21, 1878.

WITNESSES
Villette Anderson.
F. J. Masi

INVENTOR
David S. Kidder
by E. W. Anderson.
ATTORNEY

N. PETERS, PHOTO-LITHOGRAPHER, WASHINGTON, D.C.

2 Sheets—Sheet 2.

D. S. KIDDER.
Fly-Trap.

No. 204,053.   Patented May 21, 1878.

UNITED STATES PATENT OFFICE.

DAVID S. KIDDER, OF TURNER'S FALLS, MASSACHUSETTS.

IMPROVEMENT IN FLY-TRAPS.

Specification forming part of Letters Patent No. 204,053, dated May 21, 1878; application filed September 15, 1877.

*To all whom it may concern:*

Be it known that I, DAVID S. KIDDER, of Turner's Falls, in the county of Franklin and State of Massachusetts, have invented a new and valuable Improvement in Fly-Traps; and I do hereby declare that the following is a full, clear, and exact description of the construction and operation of the same, reference being had to the annexed drawings, making a part of this specification, and to the letters and figures of reference marked thereon.

Figure 1:
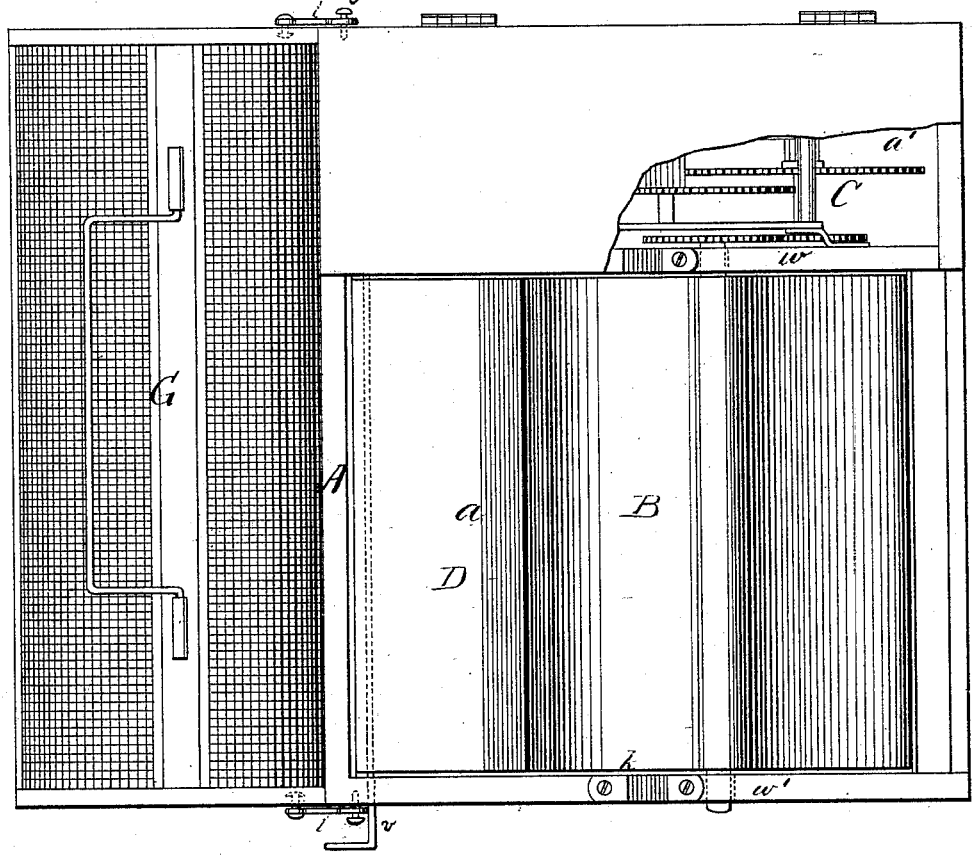
Figure 2:
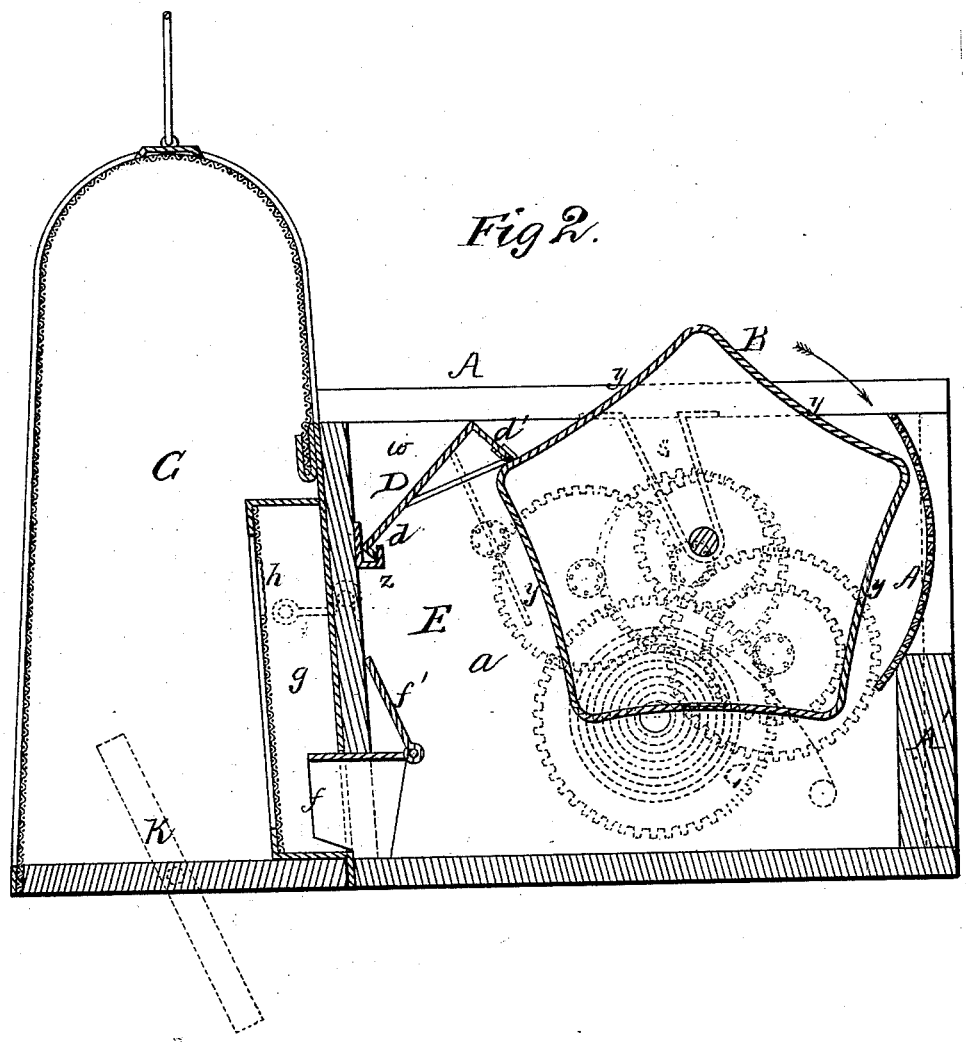

Figure 1 of the drawings is a top view of my invention. Fig. 2 is a longitudinal vertical section thereof.

The invention consists of a concave-faced polygon and a removable scraper, bent at its longitudinal edges, and having its lower edge resting loosely in a grooved ledge or bracket on the inner wall of a chamber, as will be hereinafter more fully shown and described.

In an open-topped chamber, $a$, of a box or case, A, is journaled a polygonal cylinder, B, having upon one of its journals a gear-wheel, which engages with a clock-train, C, arranged in a smaller chamber, $a'$, provided with a hinged lid. The separating-wall $w$ of the two chambers and the end wall $w'$ of the cylinder-chamber are provided with open slots $s$, in the bottoms of which are the bearings of the cylinder B. These open slots permit the ready removal of the cylinder, for the purpose of cleaning.

The surface of the cylinder being covered with molasses or similar substance, flies are enticed to alight thereupon, and, as the cylinder is revolved by the action of the clock-work too slowly to disturb them, they are carried around in the direction of the arrow, Fig. 2, and are scraped off by the scraper D, falling into the inclosed space E, in seeking egress from which they will pass through the passage-way $f$, as that is the only outlet from said inclosed space, and enter the small inclosure $g$ on the inside of wire-netting cage G, gaining admittance to the main chamber of said cage G through a small opening, $h$, near the top of the inclosure $g$. The scraper D is bent at its longitudinal edges, its lower bent edge $d$ catching in grooved ledge or bracket $z$ on the inner wall of chamber $a$, and said scraper is thus loosely pivoted, so that its other bent edge, $d'$, rests upon the surface of the revolving cylinder B, the faces $y$ of which being slightly concave, as soon as one of its angles passes from under the scraper said scraper sinks rapidly to about the middle of the next rising face, thus performing a more effective scraping action, and removing flies from the cylinder more certainly, than would the simple slow drawing of a uniformly-curved surface under the scraper. Said scraper may, owing to the manner in which it is pivoted, be readily removed, to afford access to the space E, and as readily replaced.

The cage G is secured to the case A by pivoted hooks $i$, which catch over pins $i'$, and when said cage is full of flies it may be removed for the purpose of emptying, the dead flies being brushed or shaken out through the bottom when the floor K is swung downward on its pivotal hinges, as shown in dotted lines, Fig. 2. When the cage is removed from case A, the door $f'$ of the passage-way $f$ should be closed by means of rod $v$, with which it turns. Before opening, the cage should be exposed to smoke or immersed in water, for the purpose of killing the captured flies.

The upper portion of the front wall A' of case A is formed of perforated tin or wire-netting, and curved inward. The object of this is that the light may decrease gradually to the flies, so as not to alarm them by a sudden darkness, and cause them to fly off the cylinder before an upper angle thereof comes close enough to said curved wall to confine them, as shown in Fig. 2.

What I claim as my invention is—

The combination of the concave-faced polygon B and the removable scraper D, bent at its longitudinal edges, as described, and having its lower edge $d$ resting loosely in a grooved ledge or bracket, $z$, on the inner wall of the chamber $a$, substantially as and for the purpose specified.

In testimony that I claim the above I hereunto subscribe my name in the presence of two witnesses.

DAVID S. KIDDER.

Witnesses:
 GEO. S. BARTON,
 PHILIP JACOBUS.